US012386307B2

(12) United States Patent
Gong et al.

(10) Patent No.: US 12,386,307 B2
(45) Date of Patent: Aug. 12, 2025

(54) PROCESS CARTRIDGE

(71) Applicant: JIANGXI YIBO E-TECH CO. LTD., Xinyu (CN)

(72) Inventors: Xiaomin Gong, Xinyu (CN); Shiping Ao, Xinyu (CN); Wangbo Nie, Xinyu (CN); Rongli Xu, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 18/433,966

(22) Filed: Feb. 6, 2024

(65) Prior Publication Data

US 2024/0272582 A1 Aug. 15, 2024

(30) Foreign Application Priority Data

Feb. 11, 2023 (CN) ......................... 202320186800.1
Apr. 1, 2023 (CN) ......................... 202320692666.2
May 31, 2023 (CN) ......................... 202321364144.6

(51) Int. Cl.
*G03G 21/18* (2006.01)

(52) U.S. Cl.
CPC ..... *G03G 21/1814* (2013.01); *G03G 21/1821* (2013.01); *G03G 21/1867* (2013.01); *G03G 2221/183* (2013.01)

(58) Field of Classification Search
CPC ........... G03G 21/1814; G03G 21/1821; G03G 21/1867; G03G 2221/183; G03G 21/1864; G03G 21/1825; G03G 21/1803
See application file for complete search history.

(56) References Cited

U.S. PATENT DOCUMENTS

| | | | |
|---|---|---|---|
| 9,429,877 | B2 | 8/2016 | Sato et al. |
| 9,429,906 | B2 | 8/2016 | Yoshimura et al. |
| 10,139,777 | B2 | 11/2018 | Sato et al. |
| 10,234,820 | B2 | 3/2019 | Yoshimura et al. |
| 10,254,712 | B2 | 4/2019 | Uneme et al. |
| 10,534,313 | B2 | 1/2020 | Sugimoto et al. |
| 11,112,749 | B1 † | 9/2021 | Jiang |
| 11,215,949 | B2 | 1/2022 | Yoshimura et al. |

(Continued)

FOREIGN PATENT DOCUMENTS

| | | | |
|---|---|---|---|
| CN | 103698993 B | † | 4/2014 |
| CN | 217787610 U | † | 11/2022 |
| WO | WO2023227025 A1 | † | 11/2023 |

*Primary Examiner* — Sandra Brase
(74) *Attorney, Agent, or Firm* — IPro, PLLC

(57) ABSTRACT

A process cartridge has a developing roller, a photosensitive drum, and the frame having a first frame rotatably supporting the developing roller and a second frame rotatably supporting the photosensitive drum. The first frame is movable relative to the second frame between a first position and a second position. The developing roller and the photosensitive drum are in contact at the first position and separated at the second position. A developing roller coupling member, a chip having an electrical contact surface and a separation protrusion with a force receiving surface at the lower end of the frame to receive a force to move the first frame from the first position to the second position. When the first frame is in the first position, a lower end of the force receiving surface is not lower than a lower end of the covering portion.

12 Claims, 19 Drawing Sheets

(56) References Cited

U.S. PATENT DOCUMENTS

| | | | | |
|---|---|---|---|---|
| 11,392,082 | B2 | 7/2022 | Nishida et al. | |
| 11,829,100 | B2 | 11/2023 | Fukui et al. | |
| 12,066,785 | B2 | 8/2024 | Sugimoto et al. | |
| 2005/0201773 | A1 * | 9/2005 | Matsubara | G03G 21/1867 399/90 |
| 2011/0280620 | A1 * | 11/2011 | Chadani | G03G 15/80 399/111 |
| 2013/0251402 | A1 † | 9/2013 | Yamashita | |
| 2016/0370757 | A1 * | 12/2016 | Sato | G03G 21/1821 |
| 2021/0397122 | A1 † | 12/2021 | Fukui | |
| 2024/0393741 | A1 † | 11/2024 | Zhao | |

* cited by examiner
† cited by third party

PROCESS CARTRIDGE

TECHNICAL FIELD

The present invention relates to the technical field of electrophotographic imaging, and in particular to a process cartridge.

BACKGROUND

In a conventional image forming device, a process apparatus (i.e., a developing cartridge) that can act on a photosensitive drum, and the photosensitive drum are integrated into a cartridge. The cartridge is detachably mounted on the image forming device. According to the type of the cartridge, maintenance operations on the apparatus may be performed by a user without having to rely on service personnel, thereby significantly improving operability, so that this cartridge type is widely used in image forming devices.

On the one hand, as shown in FIG. 1, a process cartridge 1 is disclosed in the prior art, which is detachably mounted in an image forming device 1. The process cartridge 1 includes a developing frame 2 that can accommodate developer, and a developing roller (not shown) rotatably supported on a developing frame 2, and further includes a drum frame 3 that can accommodate waste developer, and a photosensitive drum (not shown) rotatably supported on the drum frame 3. The process cartridge 1 further includes a separation portion 4 that can receive pushing force in the image forming device. The separation portion 4 is operatively connected to the developing frame 2. When the process cartridge 1 performs printing work, the developing roller remains in close contact with the photosensitive drum. When the process cartridge 1 does not perform printing work, the separation portion 4 can receive driving force of the image forming device and push the developing frame to swing around the drum frame 3, so that the developing roller and the photosensitive drum remain separated to avoid irreversible deformation of the outer surface of the developing roller caused by long-term contact between the developing roller and the photosensitive drum. Therefore, it can be known that the separation portion 4 is a functional component that can receive a force that forces the developing roller to separate from the photosensitive drum, and its importance is self-evident. However, the separation portion 4 in the prior art protrudes more downward than a lower end of the drum frame 3. When a user holds a handle 5 and places the process cartridge 1 on a supporting surface P such as a desktop or the ground, the lower end of the drum frame 3 and the separation portion 4 will jointly serve as a supporting portion for supporting the process cartridge 1. In this way, the two will jointly share bearing of the weight of the process cartridge 1. Over time, the thin separation portion 4 itself may be deformed or damaged, thereby affecting the separation effect of the developing roller and the photosensitive drum of the process cartridge 1. Moreover, during the transportation or transfer process of the process cartridge 1, the separation portion 4 may easily collide with the outside. Therefore, these problems need to be solved urgently.

On the other hand, the process cartridge further includes a photosensitive drum coupling member that can drive the photosensitive drum to rotate, and a developing roller coupling member that can drive the developing roller to rotate. The frame includes a driving side protective cover, and a first hole through which the photosensitive drum coupling member passes and a second hole through which the developing roller coupling member passes are formed on the driving side protective cover of the drum frame, wherein a diameter of the second hole is greater than a diameter of the first hole, and an edge of the second hole is close to a side edge of the driving side protective cover, so that the driving side protective cover has insufficient strength near this area and is prone to deformation or breakage.

SUMMARY

In order to solve the above problems, the present invention provides a new process cartridge, which is mainly realized through the following technical solutions:

On the one hand, the present invention provides a process cartridge. The process cartridge is provided with a covering portion that is at least flush with or arranged lower than a force receiving surface of the separation portion in the up-and-down direction. When the process cartridge is placed on a supporting surface, the covering portion can be used to support the cartridge to share bearing of the weight of the cartridge, which greatly reduces the possibility of the separation portion supporting the cartridge and causing deformation and damage to the separation portion.

On the other hand, the present invention discloses a process cartridge, which reduces the diameter of the second hole on the driving side protective cover, and further increases the distance between the edge of the second hole and the side edge of the driving side protective cover, thereby improving the use strength of the driving side protective cover near this area.

DETAILED DESCRIPTION

Embodiment 1

Figure 1:
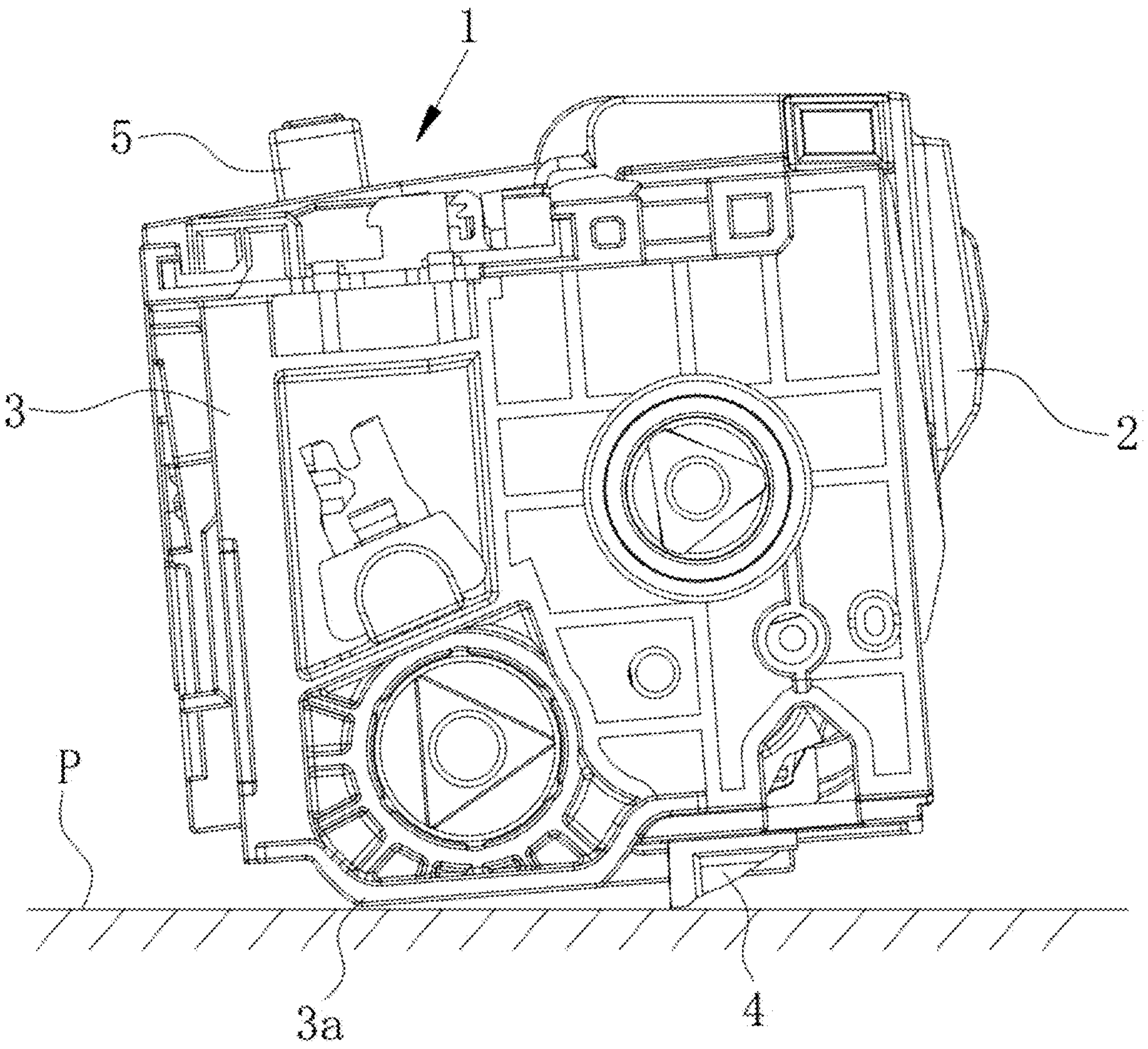
FIG. 1 is a schematic view of a process cartridge supported on the ground in the prior art.
Figure 2:
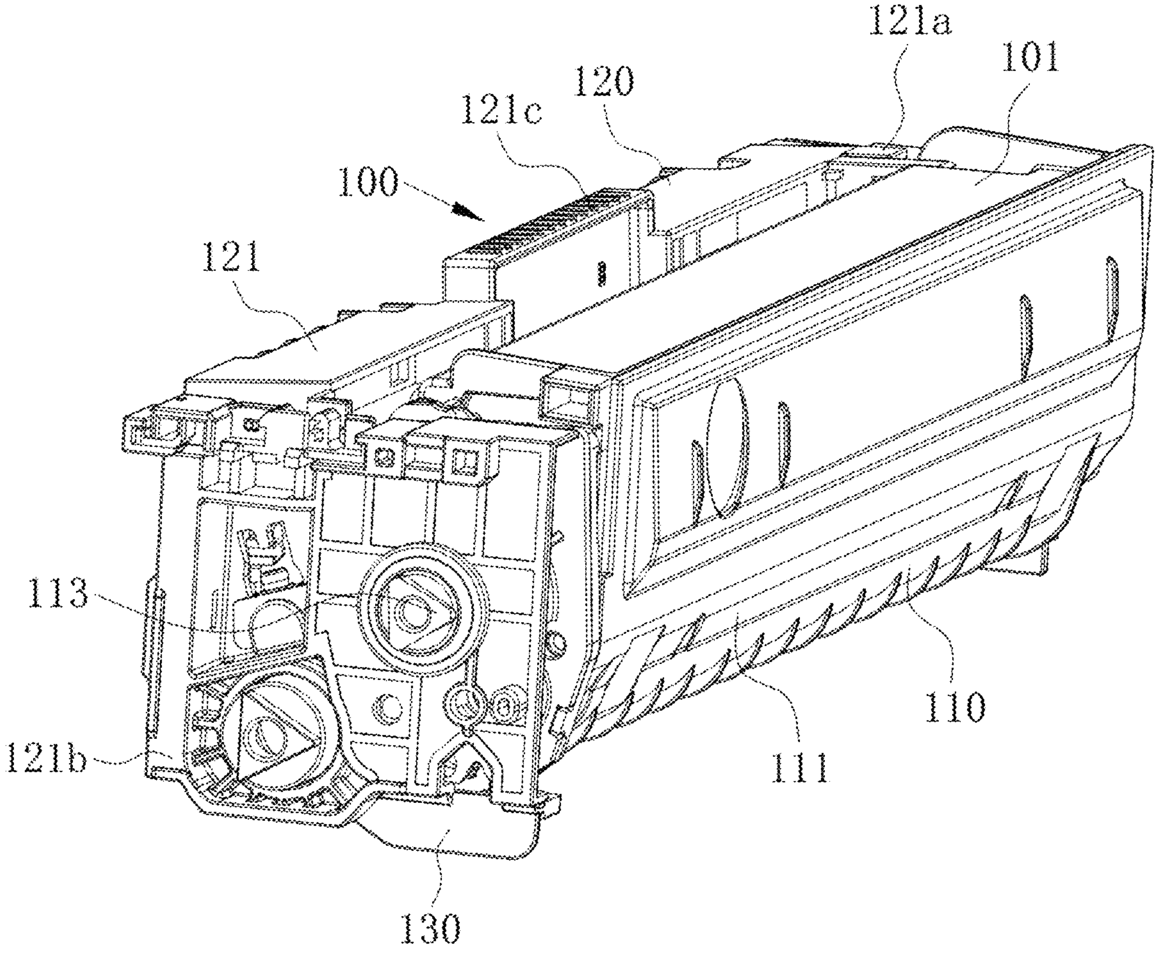
FIG. 2 is a schematic view of a process cartridge in Embodiment 1 of the present invention when viewed from an angle.
Figure 3:
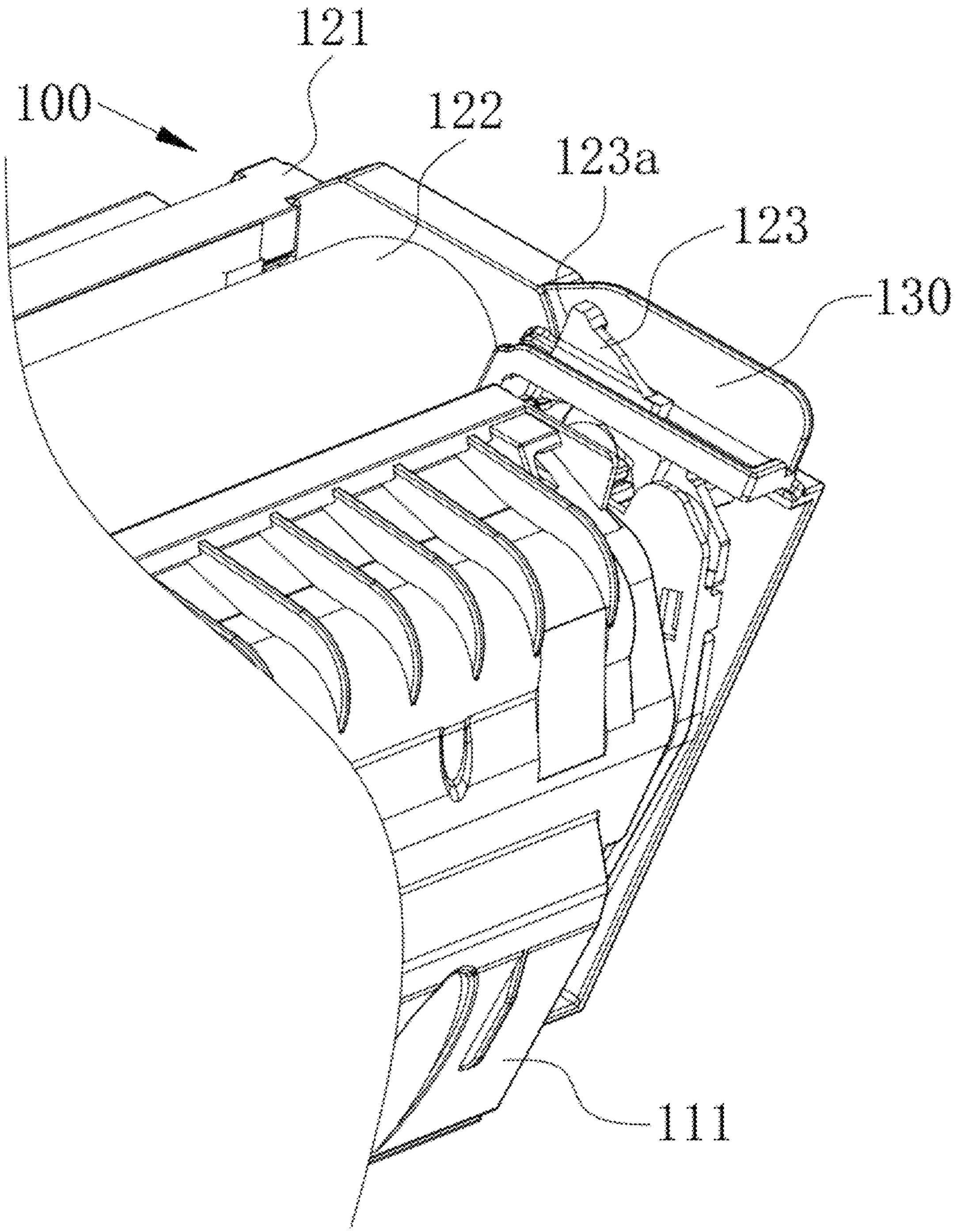
FIG. 3 is a schematic view of the process cartridge in Embodiment 1 of the present invention when viewed from another angle.
Figure 4:
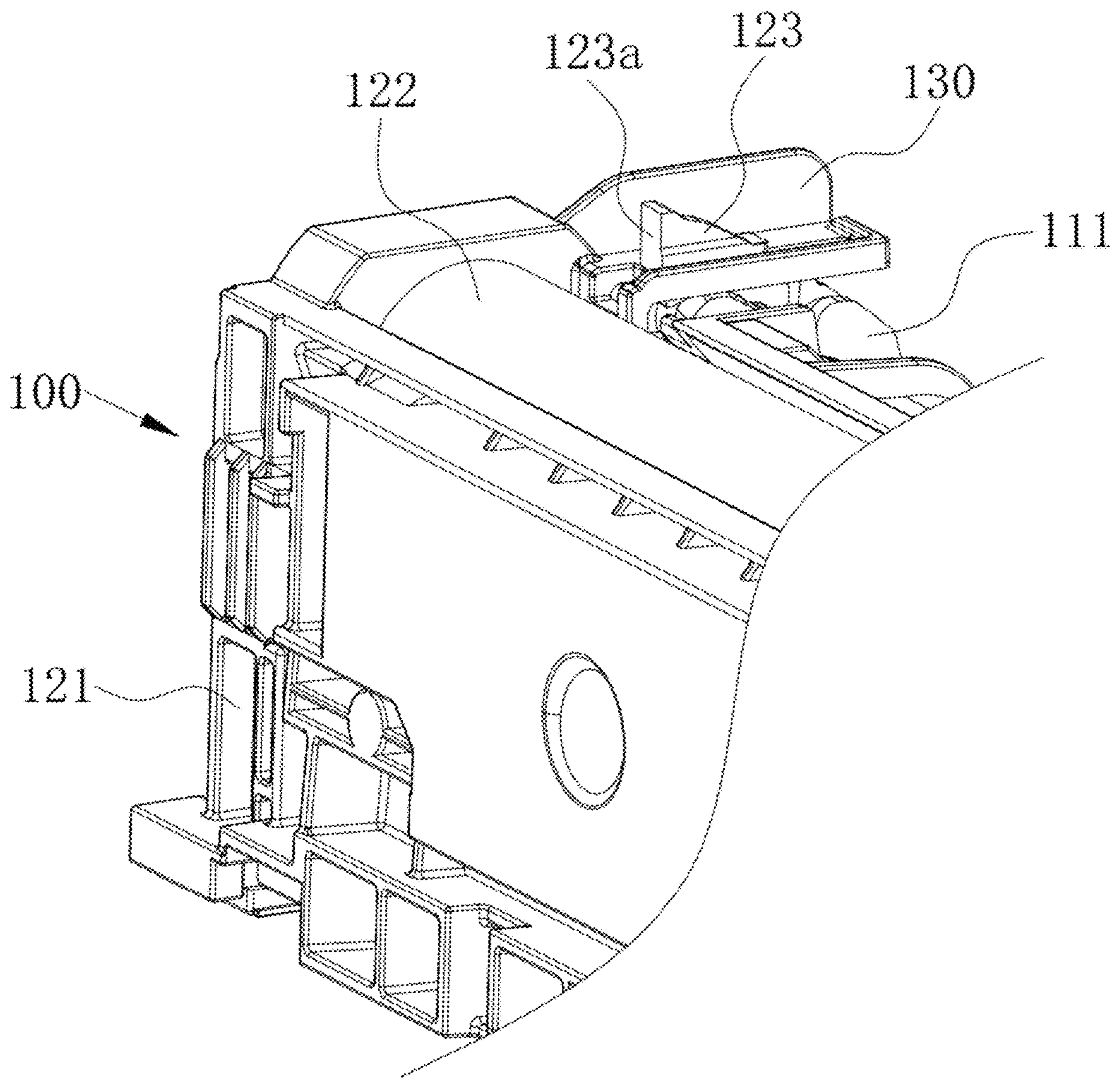
FIG. 4 is a schematic view of the process cartridge in Embodiment 1 of the present invention when viewed from further another angle.
Figure 5:
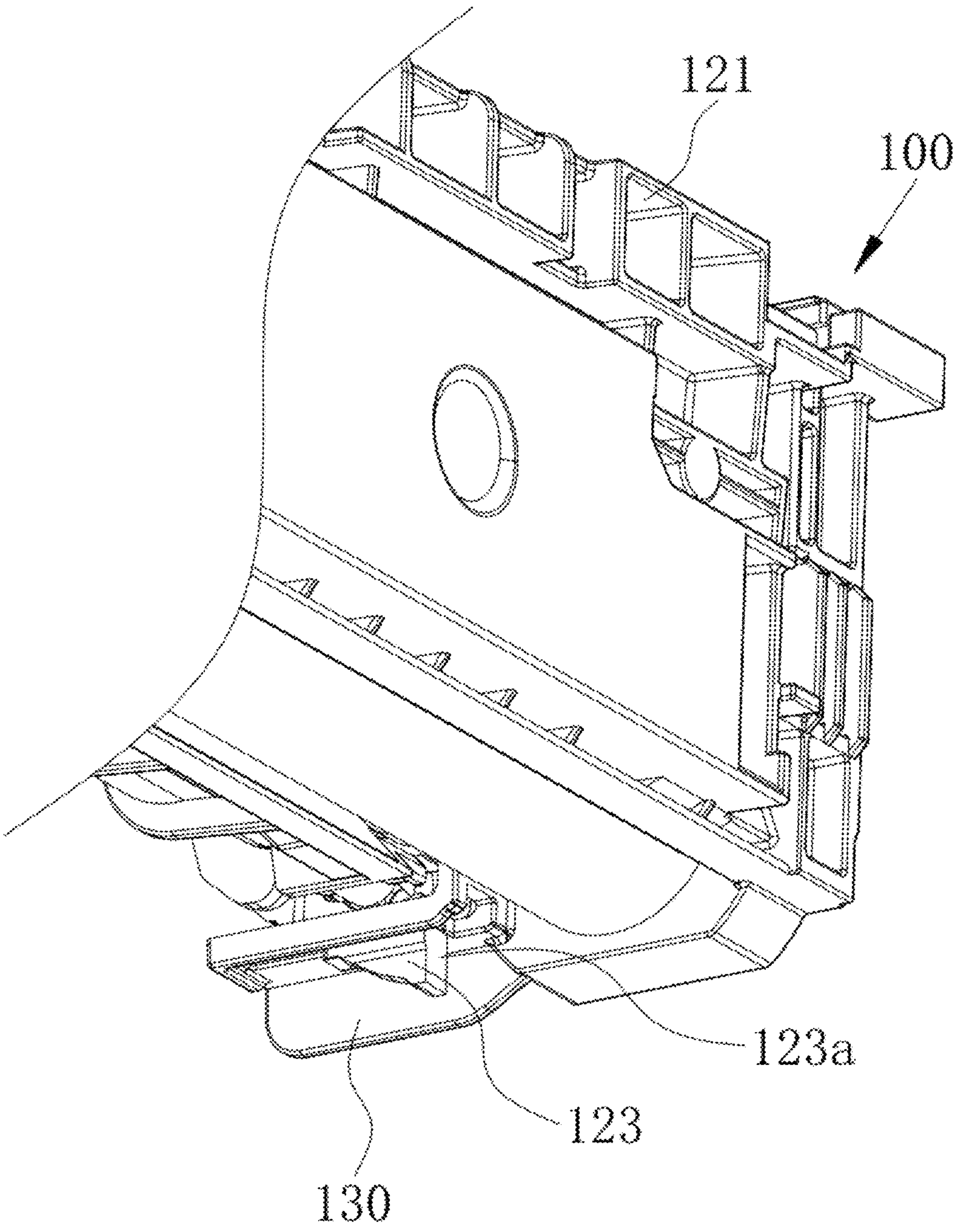
FIG. 5 is a schematic view of the process cartridge in Embodiment 1 of the present invention when viewed from yet another angle.

In order to better describe and understand a process cartridge 100 in the present invention, directions of the process cartridge 100 will be defined. A length direction of the process cartridge 100 is a left-and-right direction (also referred to as a first direction). A developing roller coupling portion 113*a* is disposed at a right end of the process cartridge 100 in the left-and-right direction. An up-and-down direction is perpendicular to the left-and-right direction. An electrical contact surface of a photosensitive drum 122 and a chip is arranged in the up-and-down direction (also referred to as a second direction), and the photosensitive drum 122 is disposed at a lower end of the process cartridge 100 in the up-and-down direction.

As shown in FIGS. 2-9, a process cartridge 100 in the present invention is shown. The process cartridge 100 is detachably mounted into an image forming device having a pushing assembly. The pushing assembly may move in a front-and-rear direction under the control of the image forming device. The process cartridge 100 includes a developing unit 110 and a drum unit 120 that are connected to each other.

The developing unit 110 includes a first frame 111 that can accommodate developer, and a developing roller 112 rotatably supported on the first frame 111. A developing roller coupling member 113 is further provided at a right end of the first frame 111, and has a developing roller coupling portion 113*a* coupled with the image forming device. The developing roller coupling portion 113*a* may receive rotational force in the image forming device to rotate and is operably coupled with the developing roller 112, and may transmit the rotational force to the developing roller 112. The developing roller 112 is rotatable about a developing roller axis extending along the left-and-right direction. The developing unit 110 further includes a bearing member for rotatably supporting the developing roller coupling member 113. The bearing member includes a bearing plate 114 and a bearing cover 115 disposed on a right side of the first frame 111. A part of the developing roller coupling member 113 is mounted between the bearing plate 114 and the bearing cover 115. The bearing plate 114 is used to support the developing roller coupling member 113. The bearing cover 115 covers and is mounted on the developing roller coupling member 113. Both the bearing plate 114 and the bearing cover 115 work together to position the developing roller coupling member 113.

The drum unit 120 includes a second frame 121 and a photosensitive drum 122 rotatably supported on the second frame 121. The photosensitive drum 122 is rotatable about a photosensitive drum axis extending in the left-and-right direction. The second frame 121 includes a frame main part 121*c* that can accommodate waste developer, and a non-driving side protective cover 121*a* and a driving side protective cover 121*b* respectively disposed on the left and right sides of the frame main part 121*c*. The frame main part 121*c*, the non-driving side protective cover 121*a* and the driving side protective cover 121*b* are integrally molded. In the present invention, a frame 101 is defined to include the first frame 111, the bearing plate 114, the bearing cover 115 and the second frame 121. An upper side of the process cartridge 100 is further provided with a handle 124 and a chip (not shown). A user may hold the handle 124 to facilitate moving the cartridge. Information such as page yield of the process cartridge 100 is stored in the chip. The chip has an electrical contact surface that is disposed at an upper end of the process cartridge 100 and may be in electrical contact with the image forming device. The chip can establish a communication connection with the image forming device through electrical contact between the electrical contact surface and the image forming device. When the process cartridge 100 performs printing work, developer accommodated in the first frame 111 is conveyed to the developing roller 112, and the developing roller 112 can convey the developer carried thereby to the photosensitive drum 122 through contact between the developing roller and the photosensitive drum 122, thereby developing an electrostatic latent image on the photosensitive drum 122. The photosensitive drum 122 transfers the developed image to a transfer belt, and finally, the transfer belt transfers the image to paper to complete the entire printing process. Therefore, it can be known that when the process cartridge 100 performs printing work, the developing roller 112 and the photosensitive drum 122 remain in contact. However, since the outer surface of the developing roller 112 is made of rubber as a main material, after being in contact with the photosensitive drum 122 for a long time, the developing roller 112 is prone to irreversible deformation, thereby reducing the printing quality of the process cartridge 100 and causing printing defects. Therefore, the process cartridge 200 is further provided with a separation portion 123 (i.e., a separation protrusion) configured as a protrusion. The separation portion 123 is operably connected to the first frame 111 of the developing unit 110. The separation portion 123 has a surface provided at the right end of the process cartridge 100, i.e., a force receiving surface 123*a*. A part of the force receiving surface 123*a* is configured to receive a force to move the first frame 111 from a first position to a second position, and the developing roller 112 supported on the first frame 111 will also move, so that the developing roller 112 and the photosensitive drum 122 can move from a contact position to a separated position. That is to say, the second position is a position where the developing roller 112 and the photosensitive drum 122 are separated. Therefore, when the process cartridge 100 does not need to perform a printing task, the developing roller 112 and the photosensitive drum 122 will be separated by a certain distance, so that printing defects caused by the developing roller 112 contacting the photosensitive drum 122 for a long time can be avoided.

In order to solve the problems existing in the prior art, the process cartridge 100 further includes a covering portion 130 disposed at one end of the frame 101. Preferably, the covering portion is disposed at a right end of the frame 101. The covering portion 130 is arranged on the lower end of the process cartridge 100 in the up-and-down direction, and is configured as a rib protruding downward from a lower side of the second frame 121 of the frame 101. Preferably, the covering portion 130 is disposed on the driving side protective cover **121*b* of the second frame 121, and is integrally molded with it. Only one set of molds is needed when the second frame 121 and the covering portion 130 are produced, reducing production costs. In the left-and-right direction, the covering portion 130 is disposed between the developing roller coupling portion 113*a* and the force receiving surface 123*a*, to avoid interference between the covering portion 130 and the separation portion 123 in the left-and-right direction, and to avoid interference between the covering portion 130 and the image forming device when the process cartridge 100 is mounted in the image forming device. Further, the covering portion 130 has a thickness L in the left-and-right direction, preferably 0.1≤L≤3 mm. It is worth mentioning that when a lower limit value is used, the strength of ordinary plastics cannot be met. For example, a metal sheet structure may be used. Preferably, 0.5≤L≤1.5 mm. The lower limit value causes the covering portion 130 to have sufficient use strength when produced using a plastic material and then have a lower cost than the metal sheet. The upper limit value may further reduce the thickness of the covering portion 130**, reduce the use of materials, and reduce production costs.

Figure 6:
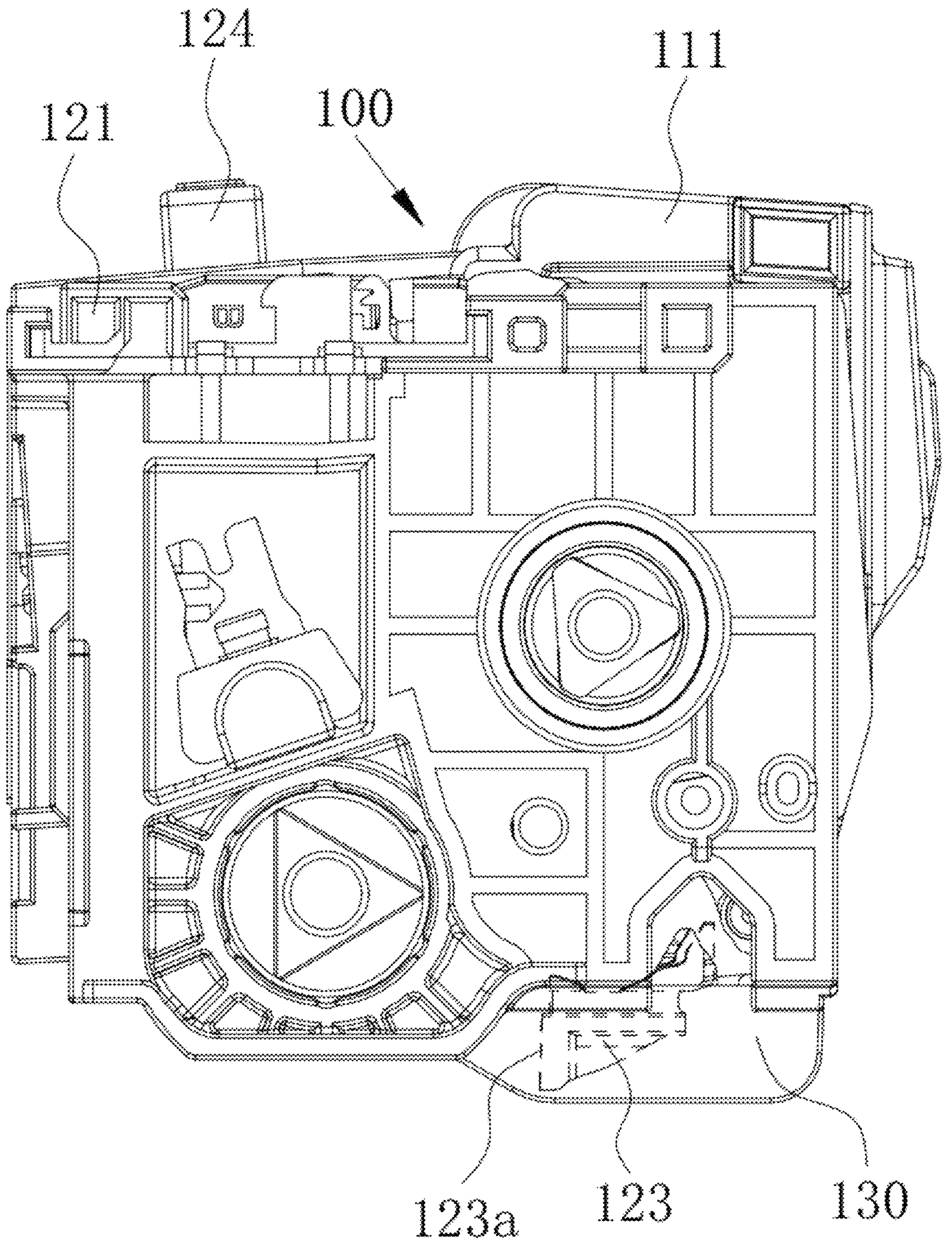
FIG. 6 is a schematic view of the process cartridge in Embodiment 1 of the present invention when viewed from a right side of the process cartridge.
Figure 7:
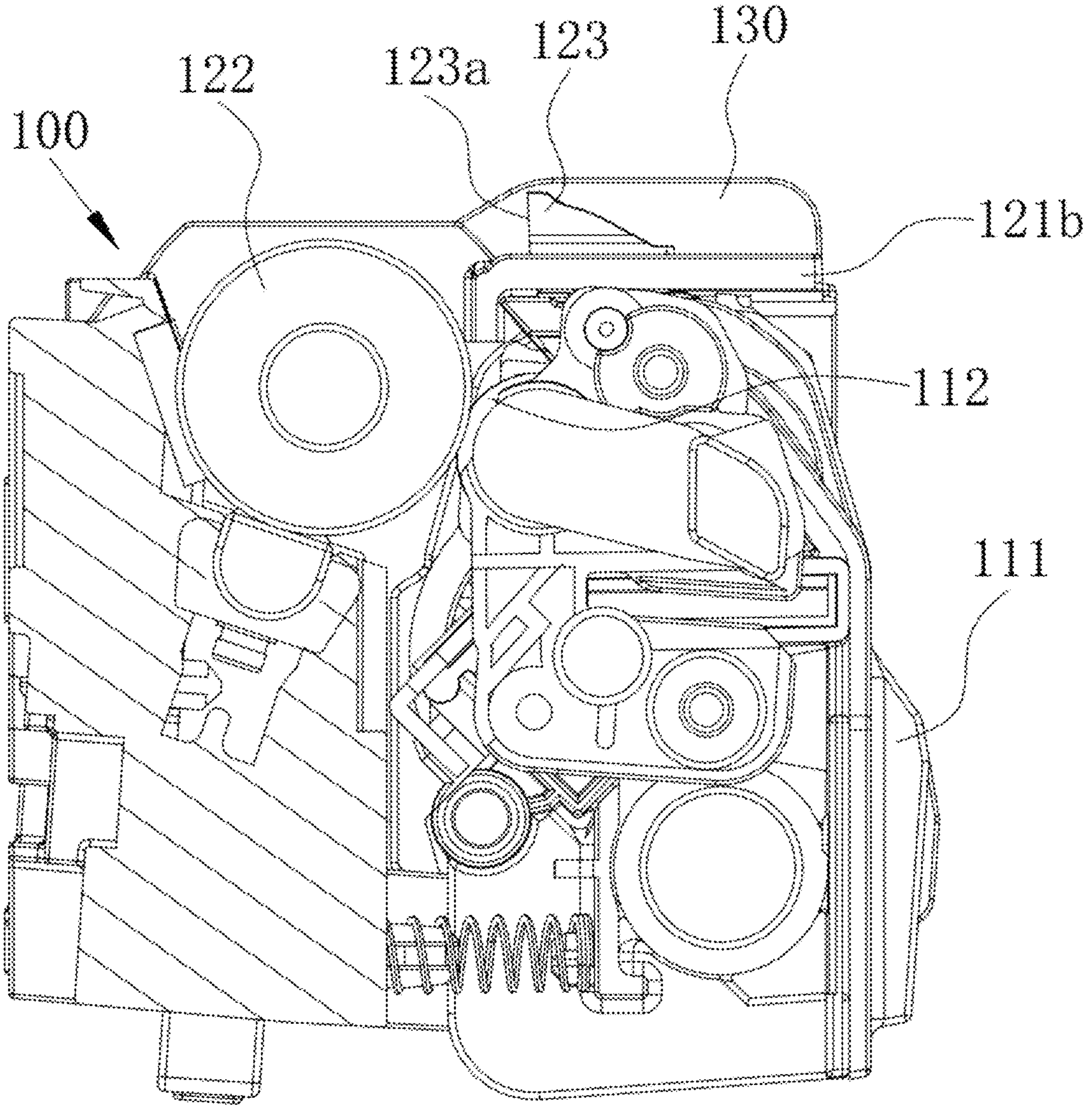
FIG. 7 is a schematic view of the process cartridge in Embodiment 1 of the present invention when viewed from a left side of the process cartridge.
Figure 8:
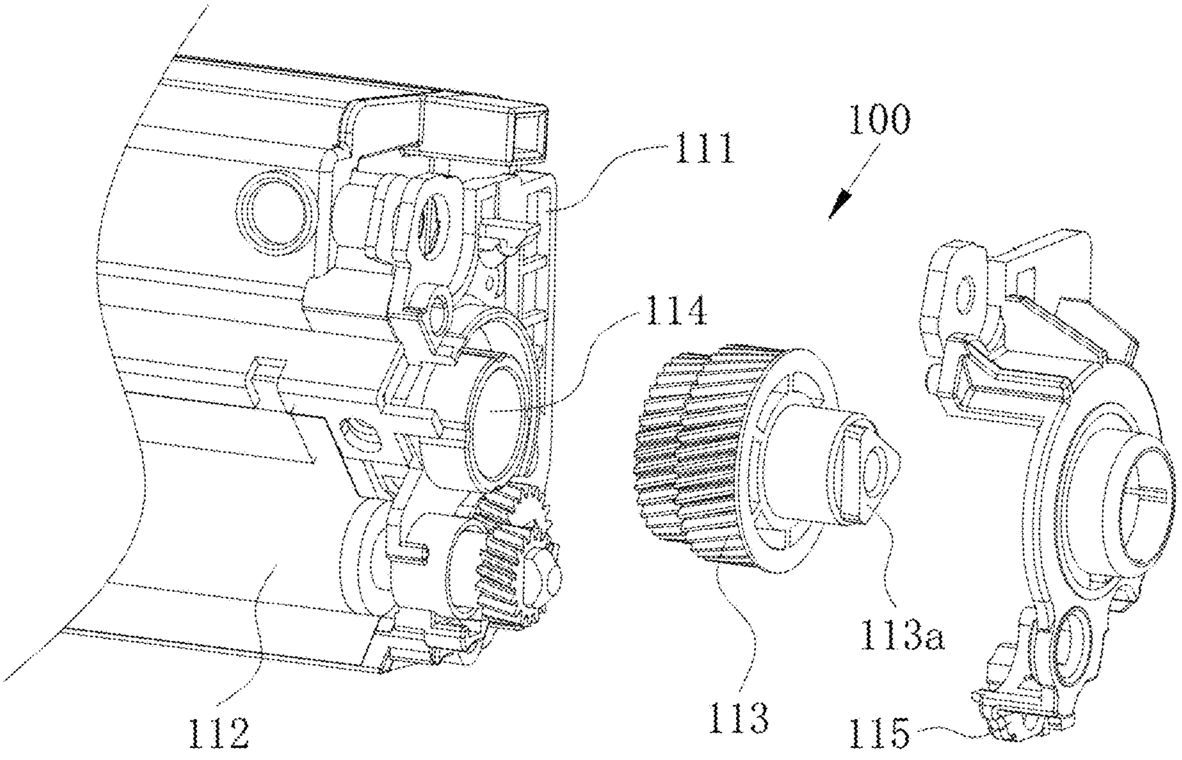
FIG. 8 is an exploded schematic view of the right side of the process cartridge in Embodiment 1 of the present invention.
Figure 9:
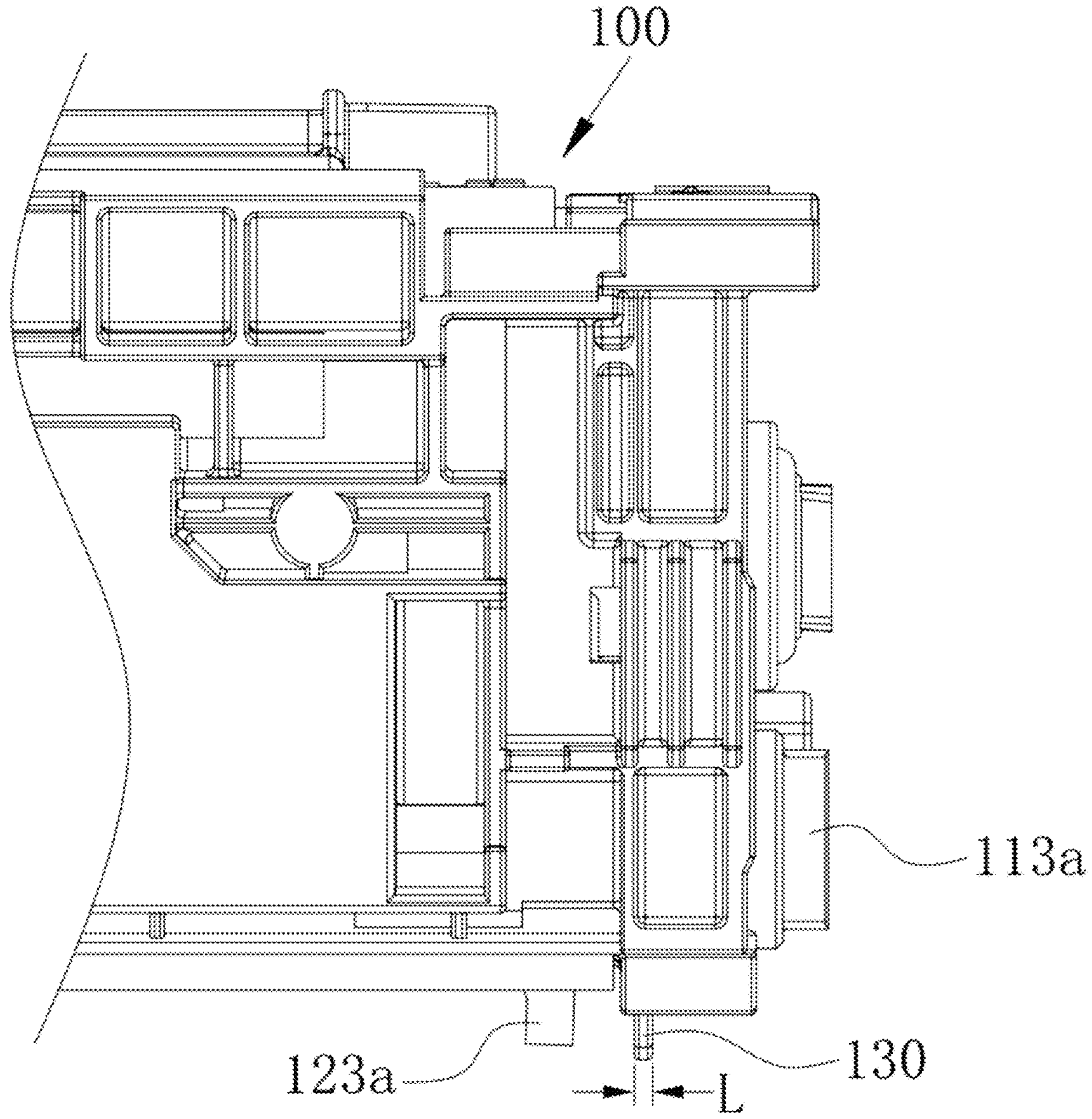
FIG. 9 is a schematic view of positions of a separation portion and a supporting portion of the process cartridge in Embodiment 1 of the present invention in a left-and-right direction.
Figure 10:
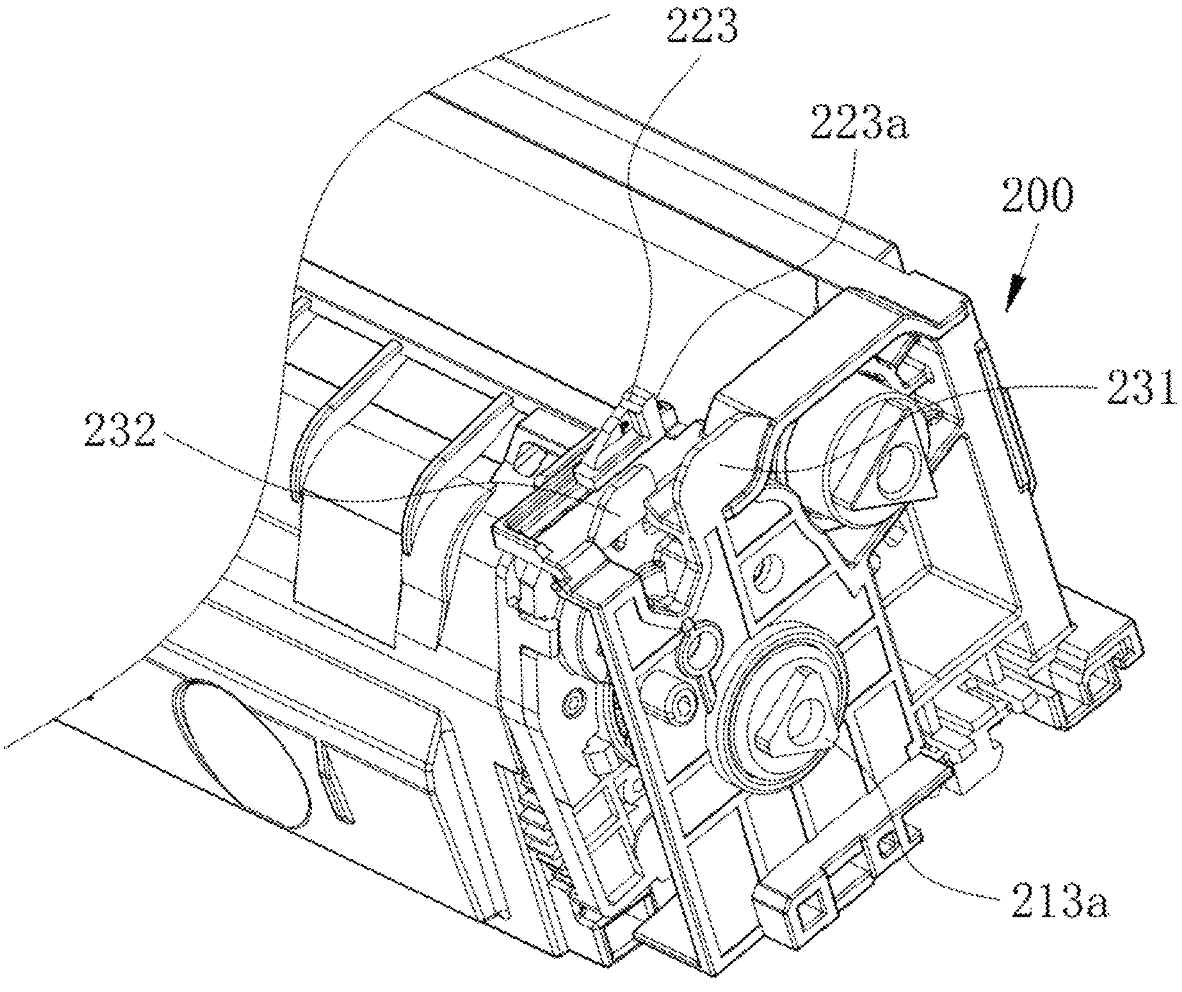
FIG. 10 is a schematic view of a process cartridge in Embodiment 2 of the present invention when viewed from an angle.
Figure 11:
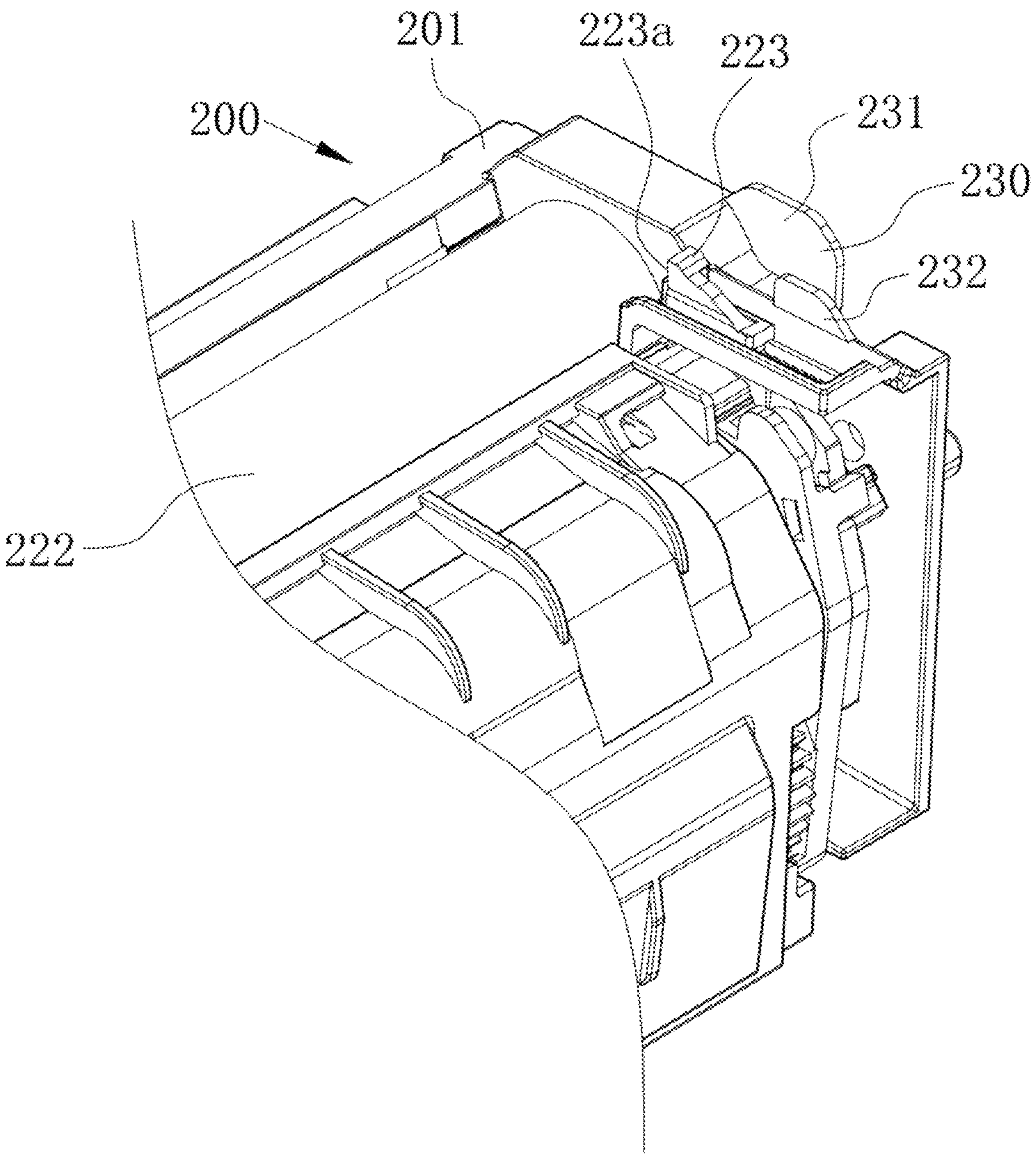
FIG. 11 is a schematic view of the process cartridge in Embodiment 2 of the present invention when viewed from another angle.
Figure 12:
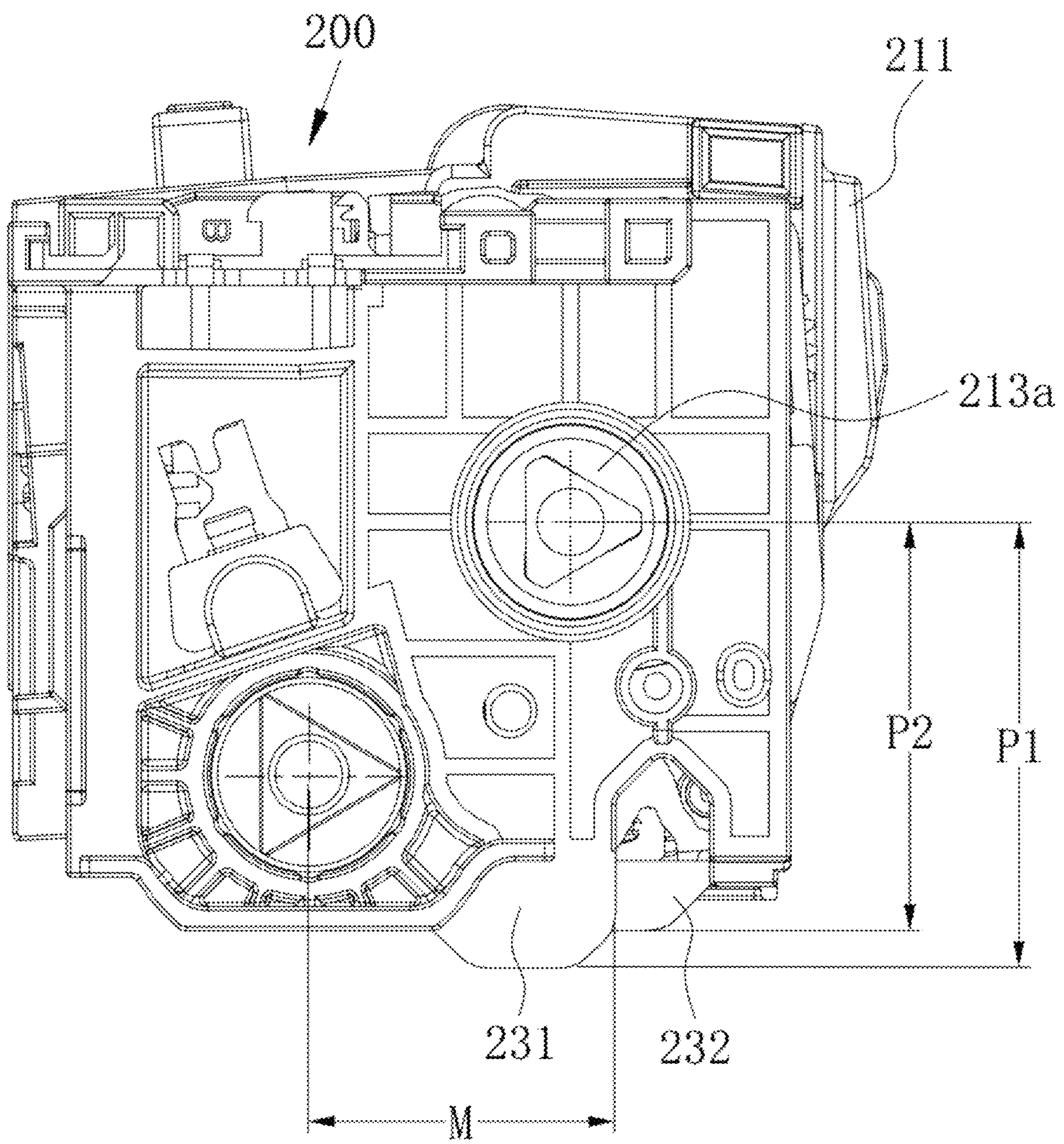
FIG. 12 is a schematic view of the process cartridge in Embodiment 2 of the present invention when viewed from further another angle.
Figure 13:
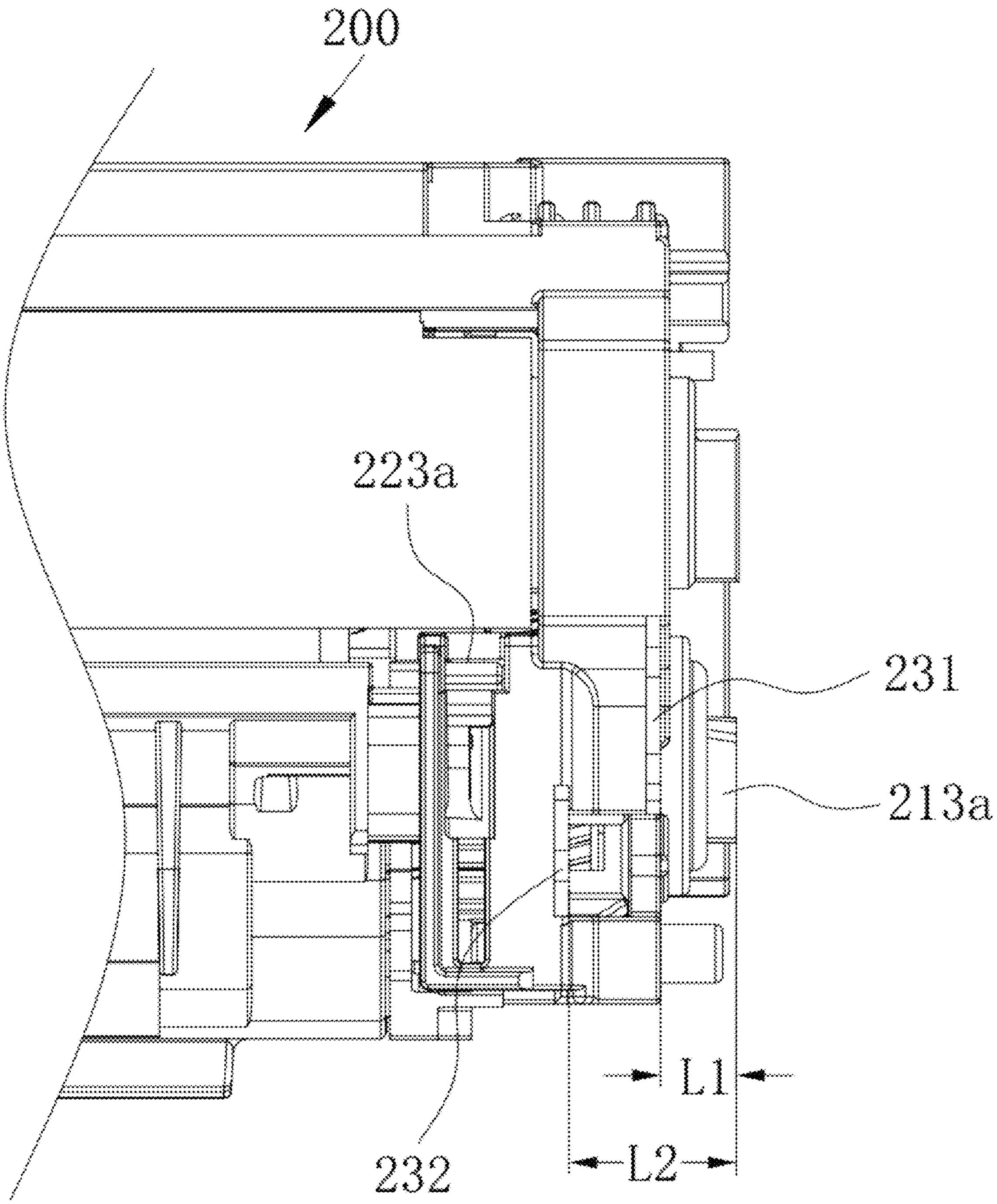
FIG. 13 is a schematic view of the process cartridge in Embodiment 2 of the present invention when viewed from yet another angle.

When the process cartridge 100 is positioned as shown in FIG. 6: the photosensitive drum 122 and the separation portion 123 are positioned at the lower end of the process cartridge 100, and the axis of the photosensitive drum 122 is located at the lower end of the axis of the developing roller 112. When viewed from right to left, the force receiving surface **123*a* of the separation portion 123 is completely covered by the covering portion 130, that is, the force receiving surface 123*a* of the separation portion 123 will be blocked by the covering portion 130 and will not be exposed. In other words, in the up-and-down direction, the covering portion 130 is not disposed higher than the force receiving surface 123*a* of the separation portion 123. One of arrangements of the covering portion 130 is that when the two are flush in the up-and-down direction, the covering portion 130, the force receiving surface 123*a* and the second frame 121 can jointly serve as a supporting portion to support the cartridge. Compared with the prior art, this further shares bearing of the weight of the process cartridge 100 and reduces the possibility of the separation portion 123 being damaged when the process cartridge 100 is placed. Furthermore, another arrangement of the covering portion 130 is that when the covering portion 130 is disposed lower than the force receiving surface 123*a* of the separation portion 123 in the up-and-down direction, namely, protruding downward, the covering portion 130 and another part of the lower end of the second frame 121 can jointly support the cartridge when the process cartridge 100 is placed on a desk top. At this time, the force receiving surface 123*a* of the separation portion 123 and the desk top will remain spaced. That is to say, the separation portion 123 will not be used to support the cartridge and bear the weight of the cartridge. Therefore, this further avoids the possibility of the separation portion 123** being damaged.

Optionally, as another optional implementation in this embodiment, the covering portion 130 may be disposed on the bearing plate 114 or the bearing cover 115 of the frame 101, and only during the movement of the first frame 111, the covering portion 130 will also move in response to the movement of the first frame 111. However, when viewed along the axis direction of the photosensitive drum 122, the covering portion 130 will still completely cover the force receiving surface **123*a* of the separation portion 123, that is, the force receiving surface 123*a* of the separation portion 123 will be blocked by the covering portion 130** and will not be exposed.

Embodiment 2

As shown in FIGS. 10-13, a process cartridge 200 in Embodiment 2 of the present invention is shown. The same parts of the process cartridge 200 as the process cartridge in Embodiment 1 will not be described again in this embodiment, and the difference thereof is that the structure and position of the covering portion 230 of the process cartridge 200 are changed. Specifically, the covering portion 230 includes a first covering portion 231 and a second covering portion 232 spaced apart in the left-and-right direction. The first covering portion 231 and the second covering portion 232 are also ribs disposed at one end of the frame 201 and protruding outward from a lower end surface of the frame 201. In the left-and-right direction, the first covering portion 231 is disposed on the right side of the second covering portion 232, and the two have an overlapping part in the front-and-rear direction, wherein at least a part of the first covering portion 231 is disposed on the rear side of the second covering portion 232. The process cartridge 200 is configured such that: when the first frame 211 is in the first position, and the process cartridge 200 is positioned such that the photosensitive drum 222 and the separation portion 223 are positioned at the lower end of the process cartridge 200, the photosensitive drum axis is located at the lower end of the developing roller axis. When viewed along the left-and-right directions, the force receiving surface **223*a* will be blocked by the first covering portion 231 and will not be exposed. The process cartridge 200 is configured such that: when the first frame 211 is in the second position, and the process cartridge 200 is positioned such that the photosensitive drum 222 and the separation portion 223 are positioned at the lower end of the process cartridge 200, the photosensitive drum axis is located at the lower end of the developing roller axis. When viewed along the left-and-right directions, the force receiving surface 223*a* will be blocked by the second covering portion 232 and will not be exposed. In order to avoid installation interference or printing interference between the first covering portion 231 and the second covering portion 232 and the image forming device, the positions of the first covering portion 231 and the second covering portion 232 in the left-and-right direction, the positions thereof in the front-and-rear direction, the heights thereof and the thicknesses thereof all need to be appropriate. Next, the positions of the first covering portion 231 and the second covering portion 232** in the left-and-right direction, the positions thereof in the front-and-rear direction, the heights thereof and the thicknesses thereof are specifically defined.

As for the positions of the first covering portion 231 and the second covering portion 232 in the left-and-right direction, they are described now with a right end surface of the developing roller coupling portion 213*a* as a reference plane, wherein a distance between a right end surface of the first covering portion 231 and a right end surface of the developing roller coupling portion 213*a* in the left-and-right direction is L1, and 4.2 mm≤L1≤8.2 mm, preferably, 4.6 mm≤L1≤5.6 mm. The distance between the right end surface of the second covering portion 232 and the right end surface of the developing roller coupling portion 213*a* in the left-and-right direction is L2, and 10.5 mm≤L2≤14.5 mm, preferably, 11.2 mm≤L2≤12.2 mm. Within this range, the first covering portion 231 and the second covering portion 232 can avoid installation interference and printing interference with the image forming device. The process cartridge 200 is configured such that, when the first frame 211 is in the first position, and the process cartridge 200 is positioned such that the photosensitive drum 222 and the separation portion 223 are positioned at the lower end of the process cartridge 300, the photosensitive drum axis is located at the lower end of the developing roller axis. When viewed along the left-and-right direction, the force receiving surface 223*a* will be blocked by the second covering portion 232 and will not be exposed.

As for the positions of the first covering portion 231 and the second covering portion 232 in the front-and-rear direction, they are described now with a rotation axis (i.e., a photosensitive drum axis) of the photosensitive drum 222 as a reference line, wherein in order to avoid installation interference with the image forming device, the distance between the front end surface of the first covering portion 231 and the photosensitive drum axis in the front-and-rear direction is M, and 13 mm≤M≤24 mm, preferably, 20 mm≤M≤23 mm.

As for the heights of the first covering portion 231 and the second covering portion 232, they are described now with the rotation axis of the developing roller coupling portion 213*a* as a reference line, wherein the distance between the lower end of the first covering portion 231 and the rotation axis of the developing roller coupling portion 213*a* in the up-and-down direction is P1, and 30 mm≤P1≤60 mm. Within this range, the first covering portion 231 can completely cover the force receiving surface 223*a* of the separation portion 223, i.e., a rear side part of the separation portion 223. Preferably, 31.5 mm≤P1≤42 mm, and more preferably, 31.5 mm≤P1≤33.5 mm. This allows the first covering portion 231 to completely cover the force receiving surface 223*a* of the separation portion 223, reducing the probability of breakage upon collision with the outside while avoiding interference with the image forming device, and also preventing the first covering portion 231 from being set too high. The distance between the lower end of the second covering portion 232 and the rotation axis of the developing roller coupling portion 213*a* in the up-and-down direction is P2, and 27 mm≤P2≤37 mm. Within this range, the second covering portion 232 can completely cover a front side part of the separation portion 223, so that the first covering portion 231 and the second covering portion 232 can jointly cover the front and rear sides of the separation portion 223. In other words, when viewed from right to left, the separation portion 223 is completely covered by the first covering portion 231 and the second covering portion 232, which can prevent the separation portion 223 of the process cartridge 300 from being deformed and damaged when colliding with the outside or being supported on the supporting surface as a supporting portion. Preferably, 29 mm≤P2≤34 mm.

As for the thicknesses of the first covering portion 231 and the second covering portion 232, i.e., the thicknesses in the left-and-right direction, both are applicable to the thickness L of the separation portion 223 described in Embodiment 1, that is, 0.1≤L≤3 mm, preferably, 0.5≤L≤1.5 mm, which will not described again here.

Embodiment 3

Figure 14:
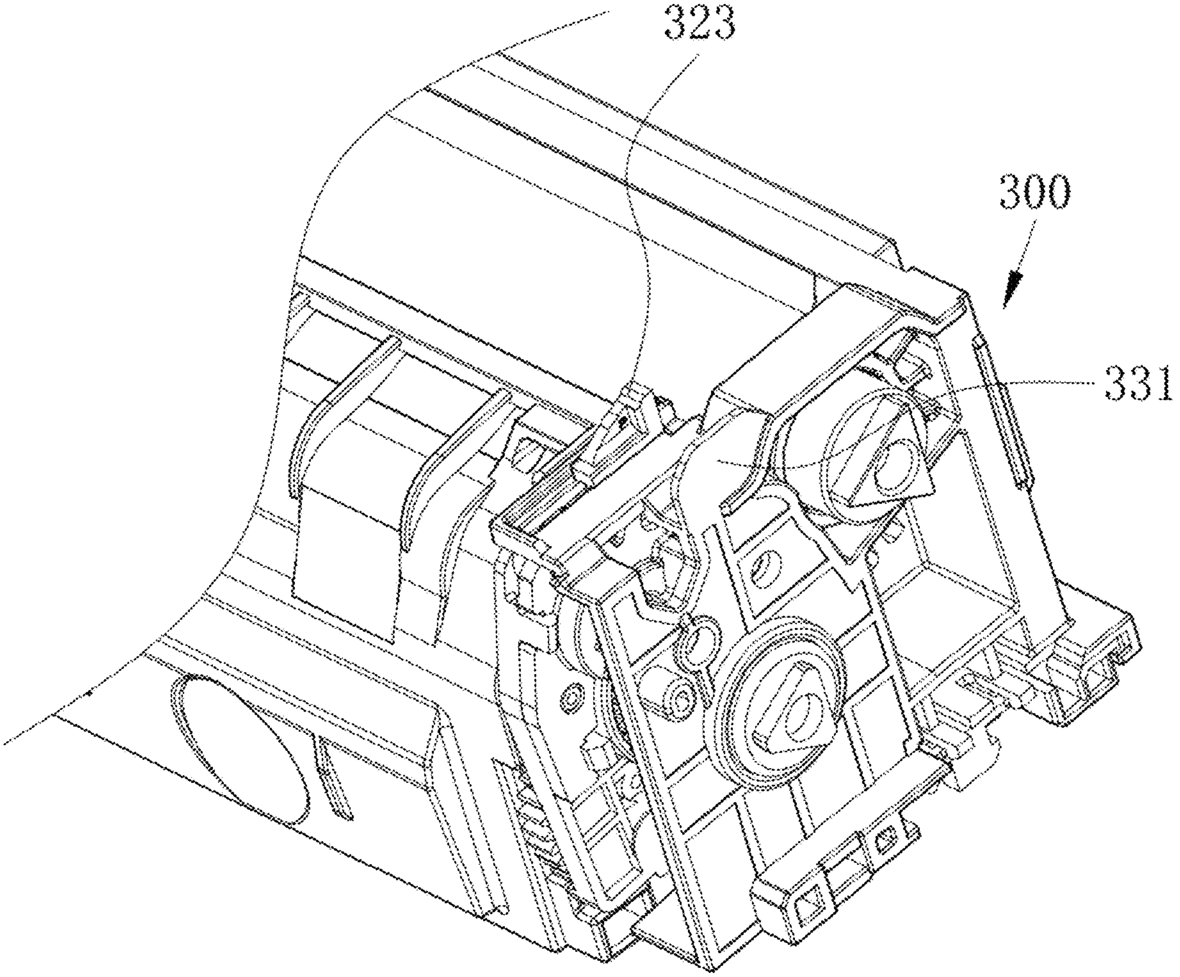
FIG. 14 is a schematic view of a process cartridge in Embodiment 3 of the present invention.
Figure 15:
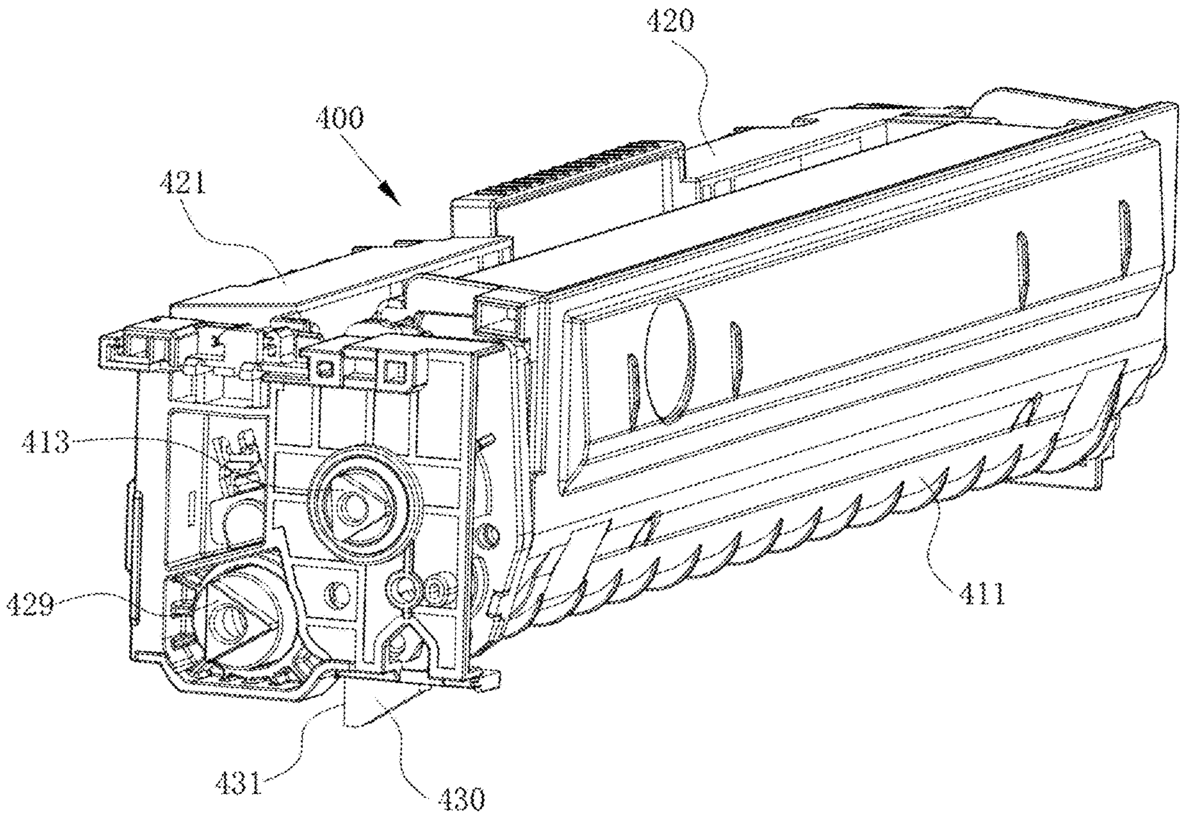
FIG. 15 is a schematic view of a process cartridge in Embodiment 4 of the present invention when viewed from an angle.
Figure 16:
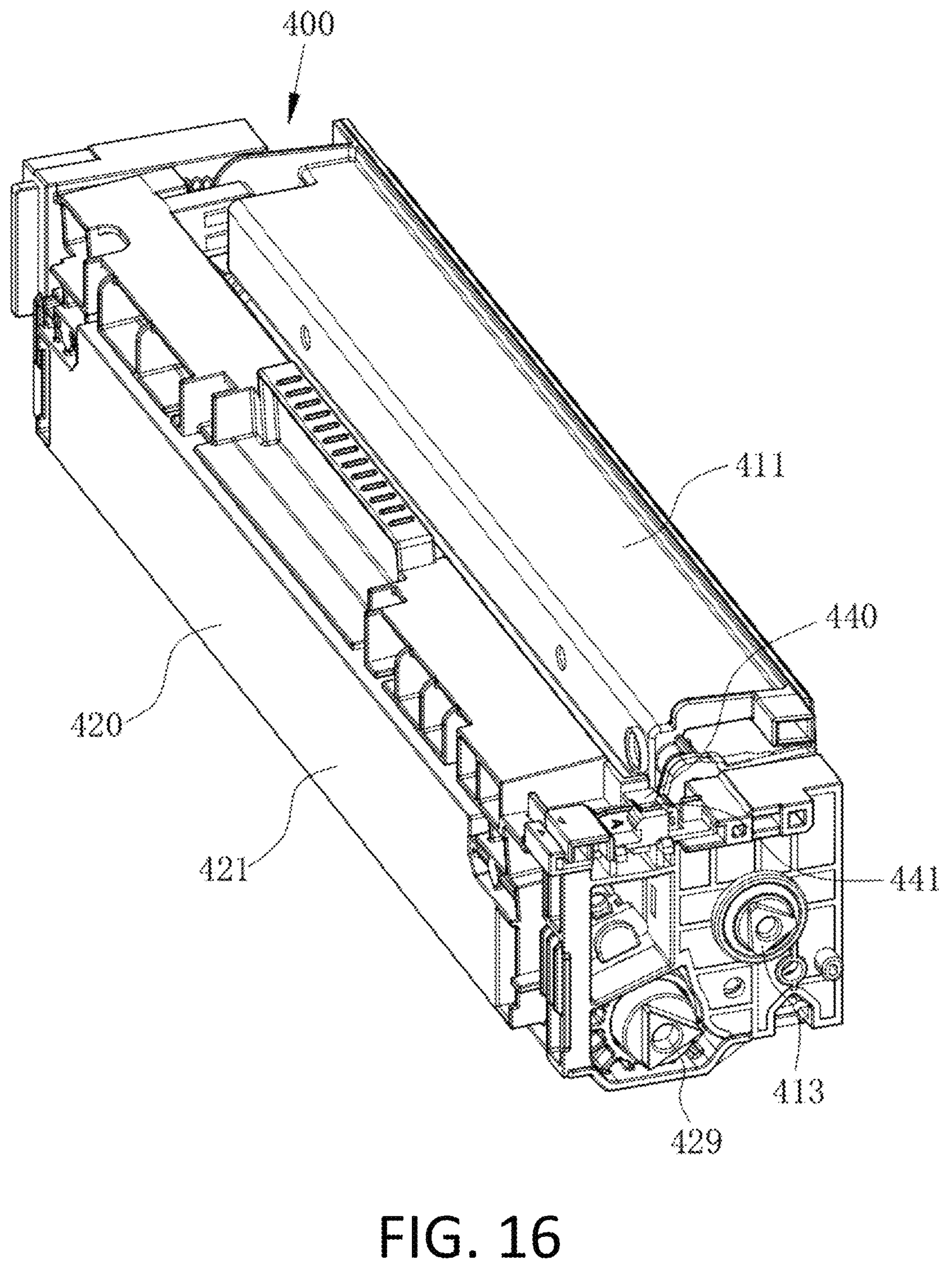
FIG. 16 is a schematic view of the process cartridge in Embodiment 4 of the present invention when viewed from another angle.
Figure 17:
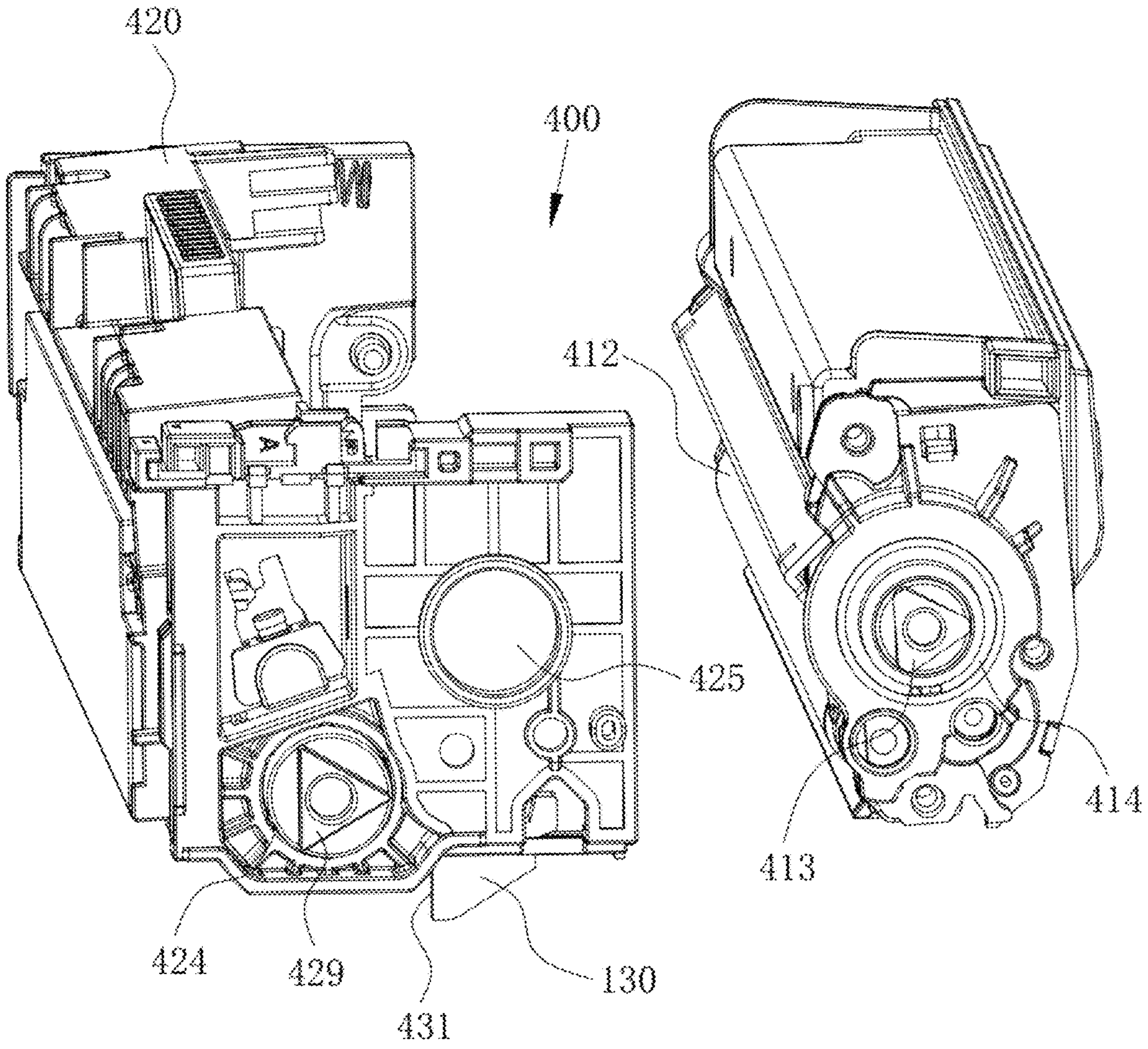
FIG. 17 is a schematic view of the process cartridge in Embodiment 4 of the present invention after a developing unit and a drum unit are separated.
Figure 18:
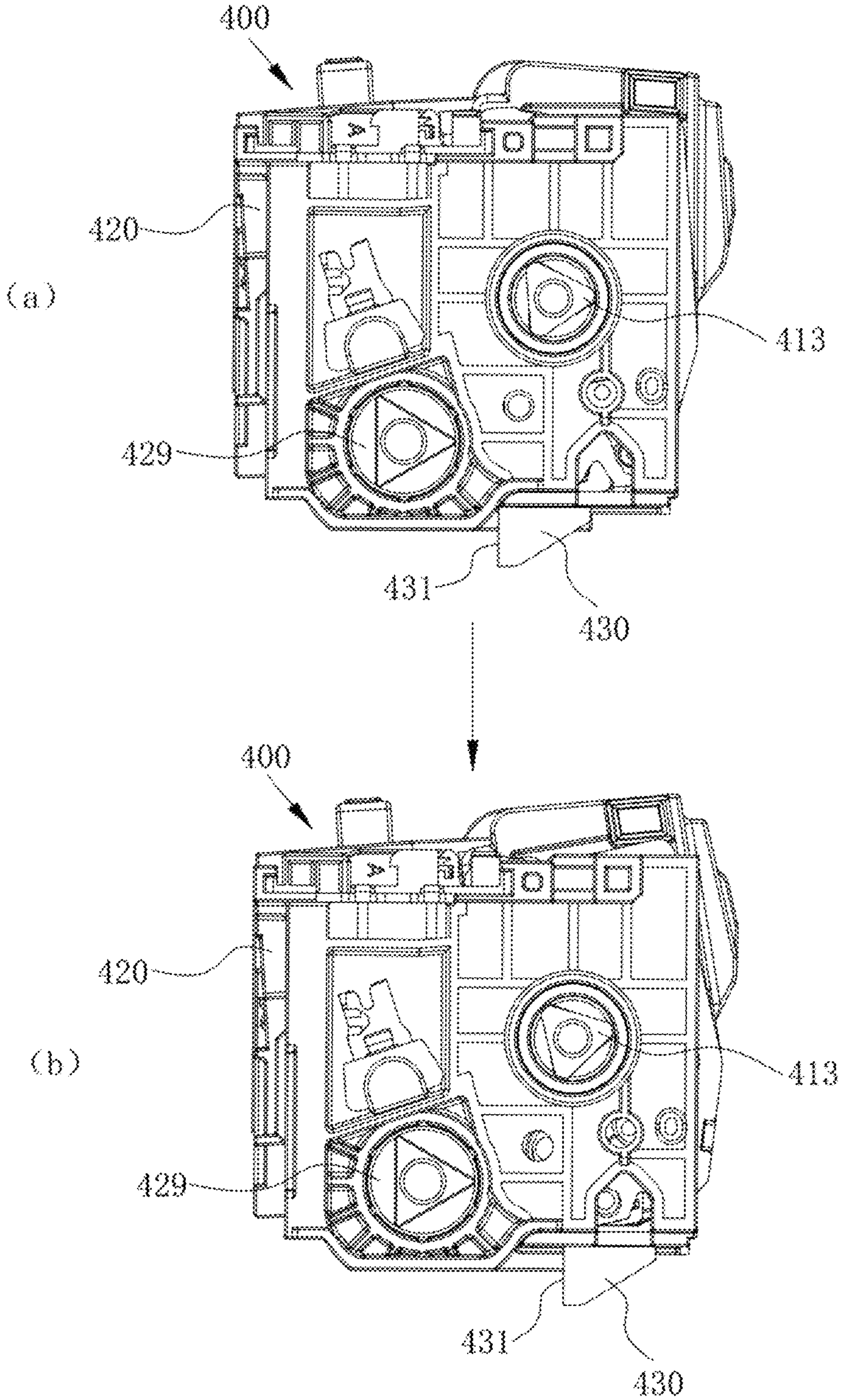
FIG. 18 is a schematic view of the movement of a developing roller and a photosensitive drum between a contact position and a separation position in Embodiment 4 of the present invention.
Figure 19:
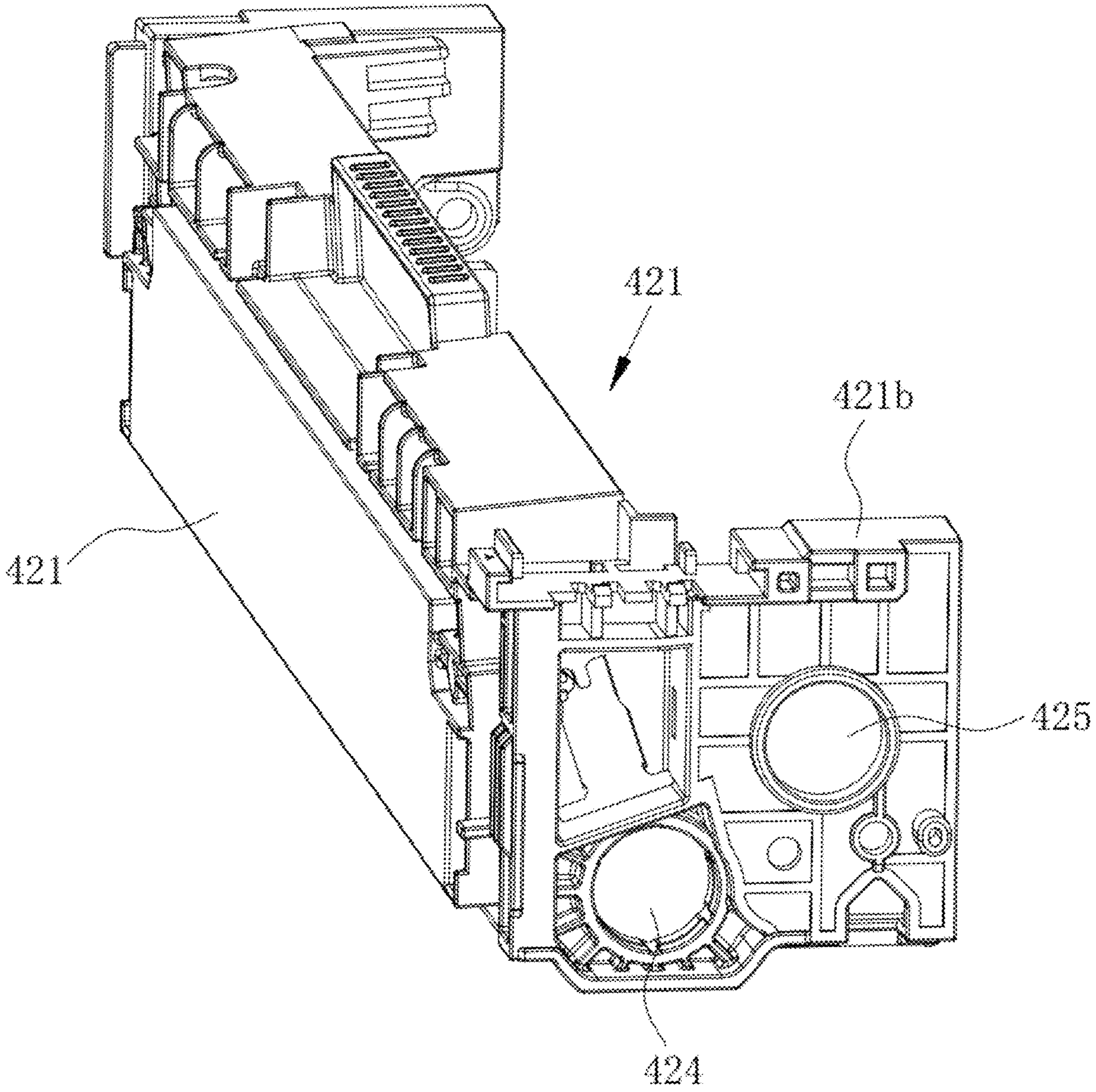
FIG. 19 is a schematic view of a drum frame in Embodiment 4 of the present invention.

As shown in FIG. 14, a process cartridge 300 in Embodiment 3 of the present invention is shown. The same parts of the process cartridge 200 as the process cartridges in Embodiments 1-2 will not be described again in this embodiment, and the difference thereof is that the process cartridge 300 in this embodiment can eliminate the second covering portion and only retain the first covering portion 331, because the front side part of the separation portion 323 covered by the second covering portion is disposed on the upper side of the lower end of the separation portion 323. When the process cartridge 300 is placed on the supporting surface, the front side part of the separation portion 323 has a smaller probability of contacting the supporting surface. Therefore, as an option, the second covering portion can be eliminated, which is helpful to reduce the material consumption of the process cartridge 300, and reduces production costs.

Embodiment 4

As shown in FIGS. 15-19, a process cartridge 400 in Embodiment 4 of the present invention is shown. The process cartridge 400 is the same as the process cartridges in Embodiments 1-3. For example, the process cartridge 400 also includes a chip. 440. The chip 440 is disposed on the driving side protective cover 421*b* of the second frame 421. The chip 440 includes an electrical contact surface 441 that is in electrical contact with the image forming device, and a storage part that stores information related to the process cartridge 400. The electrical contact surface 441 and the photosensitive drum are arranged in the up-and-down direction, wherein the chip 440 is located at the upper end of the photosensitive drum in the up-and-down direction. In the up-and-down direction, the electrical contact surface 441 is located at the upper end of the second frame 421, and in the left-and-right direction, the electrical contact surface 441 is located at the right end of the second frame 421. The image forming device can read the information stored in the storage part through electrical contact with the electrical contact surface 441, and then can establish a communication connection with the process cartridge 400. The other same parts will not be described again in this embodiment. The difference between this embodiment and Embodiments 1-3 is that a part of the structure of the driving side protective cover 421*b* is different.

Specifically, the drum unit 420 further includes a photosensitive drum coupling member 429 disposed at the right end of the photosensitive drum. The photosensitive drum coupling member 429 can receive driving force in the image forming device to drive the photosensitive drum to rotate about the photosensitive drum extending in the left-and-right direction. The driving side protective cover 421*b* is provided with a first hole 424. The first hole 424 is a circular through hole formed on the driving side protective cover 421*b*. The photosensitive drum coupling member 429 is rotataby supported by the inner peripheral surface of the first hole 424, and arranged to be exposed to the outside of the process cartridge 400 through the first hole 424, so as to couple with a driving component in the image forming device. The driving side protective cover 421*b* is further provided with a second hole 425. The second hole 425 is also a circular through hole formed on the driving side protective cover 421*b*. In the front-and-rear direction, the second hole 425 is arranged on the front side of the first hole 424. In the up-and-down direction, the second hole 425 is arranged on the upper side of the first hole 424. A bearing cover 414 is supported by the inner peripheral surface of the second hole 425, and the developing roller coupling member 413 is arranged to be exposed to the outside of the process cartridge 400 through the second hole 425, so as to be coupled with the driving component in the image forming device. Optionally, the developing roller coupling member 413 may also be arranged to be rotatably supported by the inner peripheral surface of the second hole 425, which is not limiting.

The separation portion 430 of the process cartridge 400 is operably connected to the first frame 411 and has a force receiving surface 431 that can receive the pushing force in the image forming device. In the up-and-down direction, the force receiving surface 431 is provided at the lower end portion of the frame of the process cartridge 400. The force receiving surface 431 is configured to receive a force to move the developing roller 412 from a contact position (as shown by (a) in FIG. 18) with the photosensitive drum to a separation position (as shown by (b) in FIG. 18) separated from the photosensitive drum, so as to prevent the developing roller 412 from being deformed after long-term contact with the photosensitive drum, thereby affecting the printing quality of the process cartridge 400. In the present invention, the separation portion 430 (also referred to as a separation protrusion) is movably mounted on the second frame 421.

Further, in order to avoid the problems existing in the prior art, the diameter of the second hole 425 should be reduced as much as possible, so as to improve the use strength of the driving side protective cover 421*b* and avoid its deformation. Further, the diameter D2 of the second hole 425 is configured to be equal to the diameter D1 of the first hole 424 or smaller than the diameter D1 of the first hole 424. Preferably, the diameter D2 of the second hole 425 is configured to be equal to the diameter D1 of the first hole 424, so that the second hole 425 and the first hole 424 have the same size. When performing structural design, the corresponding tolerances of the second hole 425 and the first hole 424 may be roughly the same, which facilitates the size control of the two and simplifies the structure of the driving side protective cover 421*b*. The reason why the diameter D2 of the second hole 425 is not configured to be smaller than the diameter D1 of the first hole 424 is that a second hole 425 that is too small will cause the diameter of the bearing cover 414 or the developing roller coupling member 413 supported thereon to become smaller simultaneously, which results in insufficient strength of the bearing cover 414 or the developing roller coupling member 413, so that they may easily deform or break during rotation. Therefore, taking all factors into consideration, the diameter D2 of the second hole 425 of the process cartridge 400 in the present invention is configured to be equal to the diameter D1 of the first hole 424. Further, the diameter D1 of the first hole 424 and the diameter D2 of the second hole 425 are 10 mm-20 mm, that is, $10\ mm \leq D1 = D2 \leq 20\ mm$. Within this range, the first hole 424 and the second hole 425 will not cause insufficient strength or insufficient arrangement space of the driving side protective cover 421*b* due to too large diameters, nor will they cause insufficient strength of the coupling portion or bearing cover 414 supported thereon due to too small diameters. Therefore, within the above range, it has a better effect. Preferably, $13\ mm \leq D1 = D2 \leq 16\ mm$.

Beneficial Effects

On the one hand, the present invention provides a process cartridge. The process cartridge is provided with a covering portion that is at least flush with or arranged lower than a force receiving surface of the separation portion in the up-and-down direction. When the process cartridge is placed on a supporting surface, the covering portion can be used to support the cartridge to share bearing of the weight of the cartridge, which greatly reduces the possibility of the separation portion supporting the cartridge and causing deformation and damage to the separation portion.

On the other hand, the present invention discloses a process cartridge, which reduces the diameter of the second hole on the driving side protective cover, and further increases the distance between the edge of the second hole and the side edge of the driving side protective cover, thereby improving the use strength of the driving side protective cover near this area.

What is claimed is:

1. A process cartridge, comprising:

a developing roller rotatable about a developing roller rotation axis extending in a left-and-right direction;

a photosensitive drum rotatable about a photosensitive drum rotation axis;

a frame having left and right ends in the left-and-right direction, and upper and lower ends in an up-and-down direction, the up-and-down direction being perpendicular to the left-and-right direction, and the frame comprising a first frame rotatably supporting the developing roller and a second frame rotatably supporting the photosensitive drum; the first frame being movable relative to the second frame between a first position and a second position, the first position being a position where the developing roller and the photosensitive drum are in contact, and the second position being a position where the developing roller and the photosensitive drum are separated;

a developing roller coupling member having a developing roller coupling portion configured to couple with an image forming device and to receive a rotational force thereof, the developing roller coupling portion being at the right end of the frame and configured to transmit the rotational force to the developing roller;

a chip having an electrical contact surface configured to electrically contact the image forming device, the electrical contact surface being at the upper end of the frame; and a separation protrusion operatively connected to the first frame, the separation protrusion having a force receiving surface at the lower end of the frame, the force receiving surface being configured to receive a force to move the first frame from the first position to the second position;

a photosensitive drum coupling member at the right end of the frame, configured to drive the photosensitive drum;

wherein the process cartridge further comprises a covering portion at one end of the frame in the left-and-right direction, and wherein when the first frame is in the first position, a lower end of the force receiving surface is not lower than a lower end of the covering portion;

wherein, in the up-and-down direction, the chip is above the developing roller coupling member, the developing roller coupling member is above the photosensitive drum coupling member, and the photosensitive drum coupling member is above at least a portion of the covering portion.

2. The process cartridge according to claim 1, wherein the force receiving surface is covered by the covering portion when viewed from right to left in the left-and-right direction.

3. The process cartridge according to claim 1, wherein the covering portion is between a right end of the developing roller coupling portion and a right end of the force receiving surface in the left-and-right direction.

4. The process cartridge according to claim 1, wherein the covering portion is a rib protruding downward from the second frame.

5. The process cartridge according to claim 1, wherein one end of the second frame is provided with a driving side protective cover, the developing roller coupling member passes through the driving side protective cover and is exposed outward, and the covering portion is on the driving side protective cover.

6. The process cartridge according to claim 5, wherein the covering portion and the driving side protective cover are integrally molded.

7. The process cartridge according to claim 1, wherein the covering portion has a thickness L in the left-and-right direction, wherein 0.1 mm≤L≤3 mm.

8. The process cartridge according to claim 1, wherein a distance between a right end of the covering portion and a right end of the developing roller coupling portion in the left-and-right direction is L1, wherein 4.2 mm≤L1≤8.2 mm.

9. The process cartridge according to claim 1, wherein a distance between a front end of the covering portion and the photosensitive drum rotation axis in a front-and-rear direction is M, wherein 13 mm≤M≤24 mm, wherein the front-and-rear direction is perpendicular to both the left-and-right direction and the up-and-down direction.

10. The process cartridge according to claim 1, wherein a distance between a lower end of the covering portion and a rotation axis of the developing roller coupling portion in the up-and-down direction is P1, wherein 30 mm≤P1≤60 mm.

11. The process cartridge according to claim 1, wherein when the first frame is in the first position, at least a part of the separation protrusion is exposed outside the covering portion when viewed from right to left in the left-and-right direction.

12. The process cartridge according to claim 1, wherein, when the first frame is in the second position, at least a part of the separation protrusion is exposed outside the covering portion when viewed from right to left in the left-and-right direction.

* * * * *